No. 664,237. Patented Dec. 18, 1900.
W. L. DEMING.
KEROSENE SPRAYER.
(Application filed May 7, 1898. Renewed Nov. 10, 1900.)

(No Model.) 2 Sheets—Sheet 1.

Witnesses:
Harry S. Rohrer
F. W. Ritter, Jr.

Inventor:
Wm. L. Deming
by Wm. C. Dyre,
Attorney.

THE NORRIS PETERS CO., PHOTO-LITHO., WASHINGTON, D. C.

No. 664,237.  
W. L. DEMING.  
KEROSENE SPRAYER.  
(Application filed May 7, 1898. Renewed Nov. 10, 1900.)
(No Model.)  
Patented Dec. 18, 1900.  
2 Sheets—Sheet 2.
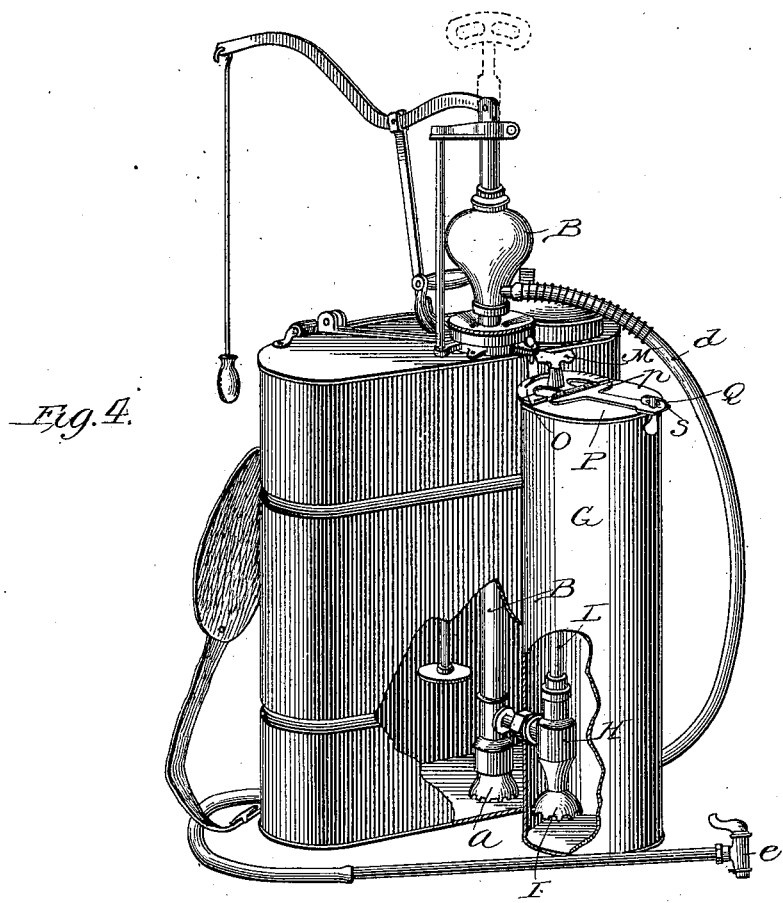
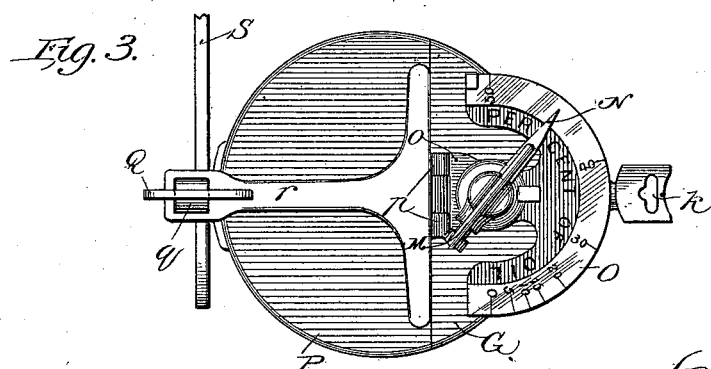

UNITED STATES PATENT OFFICE.

WILLIAM L. DEMING, OF SALEM, OHIO, ASSIGNOR TO THE DEMING COMPANY, OF SAME PLACE.

KEROSENE-SPRAYER.

SPECIFICATION forming part of Letters Patent No. 664,237, dated December 18, 1900.

Application filed May 7, 1898. Renewed November 10, 1900. Serial No. 36,086. (No model.)

*To all whom it may concern:*

Be it known that I, WILLIAM L. DEMING, a citizen of the United States, residing at Salem, in the county of Columbiana and State of Ohio, have invented certain new and useful Improvements in Kerosene-Sprayers; and I do hereby declare the following to be a full, clear, and exact description of the invention, such as will enable others skilled in the art to which it appertains to make and use the same.

Generally stated, my present invention relates to portable pumping apparatus, but consists, more particularly stated, in mechanism whereby kerosene-oil and water or other insecticides are first thoroughly mixed in the act of pumping and then applied in a mist-like spray to growing vegetation for the purpose of exterminating noxious insects—such as plant-lice, chinch-bugs, cabbage-worms, and San José and other scale insects—which constantly threaten the healthy growth of plants, bushes, trees, and vines.

As a further object the invention provides for the accurate admixture of oil and water in predetermined proportions, according to surrounding conditions, the subject to be treated, the season of the year, or the insect to be destroyed. In like manner other insecticides, such as paris-green, may be handled by the same agencies, or fungicides for preventing and curing growth of parasitic fungi may be similarly employed, and in addition to above uses it is obvious that the apparatus may be utilized for sprinkling purposes, cleaning of windows, extinguishing fires, and in a great variety of other uses common to appliances of similar nature.

The invention will be hereinafter particularly described, and pointed out in the claims following.

Figure 1:
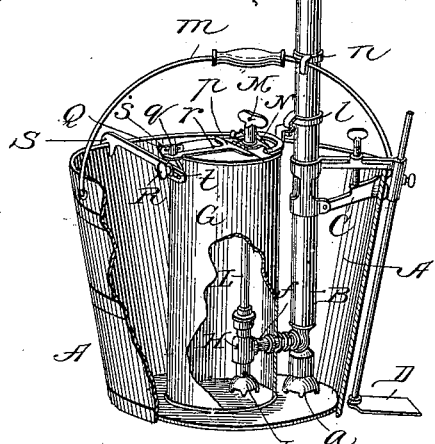
Figure 2:
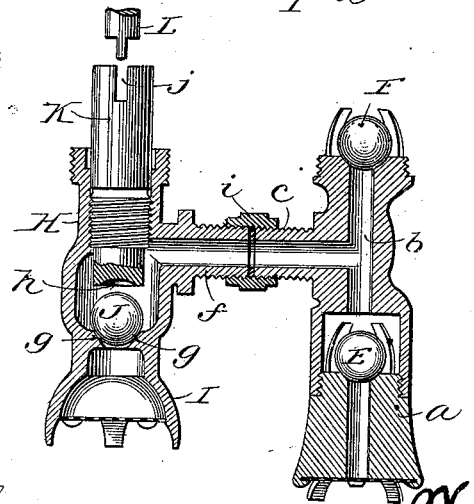

In the accompanying drawings, which form part of this specification, and whereon corresponding reference-letters indicate the same parts in the several views, Figure 1 is a perspective view of my invention, comprising a water-bucket, partly in section, a force-pump secured in said bucket, and an oil-tank, also within said bucket, broken away for purposes of illustration. Fig. 2 is a central vertical section through both intake-ports, check-valves, and stop-cock. Fig. 3 is a plan view of an oil-tank, including also a movable dial and a graduated dial-plate, for regulating and indicating the proportions of oil used; and Fig. 4 is a perspective view, partly in section, of a knapsack-sprayer embodying a modified form and use of the invention.

Reference being had to the drawings and letters thereon, A indicates a water-bucket of ordinary form, within which is located a pump B, the barrel or stock whereof is detachably secured to the side of bucket A by means of the screw-actuated clamp C, the latter provided with an adjustable foot-rest D, as shown by Fig. 1. At its lower end pump B is furnished with a restricted intake-port $a$, a caged foot-valve E, a vertical passage $b$, and a main check-valve F above, while at an intermediate point between valves E F there is a screw-threaded intake-port $c$ communicating with the passage $b$ for purposes that will later appear. At its upper end said pump is equipped with a hose-section $d$ and a graduated discharge-nozzle $e$, of approved construction, for delivering a continuous spray of liquid according to requirements.

G indicates a secondary reservoir for containing kerosene-oil or other liquids employed in conjunction with contents of bucket A, in which said reservoir or oil-tank is located. Within tank G is provided a graduated or reduction valve, consisting of a valve-case H, a foot or suction member I, an angular outlet or delivery port $f$, a valve-seat $g$, a ball-valve J, and valve-stem K, the latter being in screw-threaded connection with the upper end or walls of case H and having a concave lower extremity $h$ for engaging the surface of ball-valve J, and thus limiting its upward movement. The outlet or delivery port $f$, as shown by Fig. 1, projects through the wall of reservoir G and is coupled to intake-port $c$ of pump B by means of a union or screw ring $i$, thus establishing communication between reservoir G and pump B when the position of valve J will permit.

Projecting upward from a key-seat $j$ in valve-stem K is a key L for elevating or depressing said stem in its screw-threaded bearing, as best shown by Fig. 2, while its opposite end, projecting through the top of reservoir G, has affixed thereto a wing-nut M to facilitate turning and also a dial N for indicating at all times the relative position of valve-stem K upon a suitable graduated dial-plate O immediately below. Cast integral with the inner side of dial-plate O is an eye $k$, which receives an angular vertically-movable latch $l$, mounted upon the stock of pump B for engaging said eye $k$, thereby locking reservoir G in operative relation with pump B in like manner as the bail $m$ of bucket A is maintained in upright position by a corresponding latch $n$, also upon the stock of pump A. To that side of protruding key L opposite the eye $k$ aforesaid dial-plate O is cast, with one hinge member $o$ for engaging a correlative hinge member $p$, and thus securing a hinged lid or cover P to the top of reservoir G and providing for filling the latter. At the top outer edge of reservoir G is a staple $q$, arranged in the path of hasp $r$, the latter, by preference, cast integral with hinge member $p$ and perforated at its distal end to receive the upstanding staple $q$ when cover P is closed. Mounted in the bifurcated end of said staple $q$ is a locking bar or button Q, formed with an elongated central slot $s$, affording a bearing for a retaining-pin upon which said button is thus slidingly mounted.

Journaled upon the side of staple $q$ and there retained by a thumb-screw R, operating through a slotted connection $t$, is a swinging hook or latch S, adapted to engage the rim of bucket A as an additional means for supporting and maintaining parts in operative positions.

Having thus described my invention in one convenient inexpensive form of construction, I will now proceed to describe its use and operation; but first it should be understood that I by no means limit myself to the particular form and arrangement of parts herein shown and described, but, on the contrary, the leading features of my invention may be employed in a large variety of spraying tanks and apparatus designed and arranged for the distribution of two or more liquids in predetermined proportions through the agency of a common pump. An example of such modifications is to be seen upon reference to Fig. 4, illustrating the invention as applied to spraying apparatus of the knapsack order.

Referring more particularly to Fig. 1 and presuming for purposes of description that bucket A be filled with water and that secondary reservoir G be similarly filled with kerosene-oil, also that pump B and reservoir G are secured in the position shown by means of clamp C, aided by latches $l$ S, it will now be observed that pump B may be employed to draw from the receptacles A G water and oil, respectively, which are thereupon thoroughly mixed in the stock of said pump and delivered through nozzle $e$ at end of hose-section $d$. In this connection the water serves chiefly as a vehicle to convey the oil; but it is a matter of prime importance that a ratio be established and maintained between the oil and water supplies, according to the purposes for which the admixture is used. The capacity of the water-intake $a$ is fixed, but that of the oil-intake or suction member I may be graduated to a nicety or shut off entirely in the following manner: A percentage of oil best suited for intended uses having been determined upon, valve-stem K, in threaded connection with its case H, is elevated or depressed by a partial rotation one way or the other of the key L, such movement being indicated by its affixed dial N, in connection with dial-plate O above reservoir G. Thus much, little, or no oil may pass valve J, according to the play allowed said valve by its limiting valve-stem K above. Presuming the relative arrangement of valve and stem to be, however, as indicated by Fig. 2, it is apparent that each upstroke of the plunger in pump A serves to charge the barrel of said pump with both water and oil in predetermined proportions, the former passing through intake $a$, past foot-valve E, vertical passage $b$, and main check-valve F to the pump-stock. Simultaneously with this action oil is taken from reservoir G through suction member I, past valve J, and through outlet $f$ to and into the vertical passage or water way $b$ aforesaid, where oil and water meet and mingle. On the contrary, a downstroke of the pump-plunger next serves to seat valves E, F, and J, which positively check the return of oil or water to bucket A or reservoir G and at the same time deliver the contents of pump B in the usual manner, such operation continuing as long as the contents of the bucket and reservoir will permit or occasion requires.

Having thus described my invention, what I claim, and desire to secure by Letters Patent, is—

1. In a portable pump the combination with a plurality of intake-ports, of check-valves guarding said ports, and mechanism for establishing a predetermined ratio of supply through said intake-ports, substantially as described.

2. In a portable pump the combination with a plurality of intake-ports, of a suitable check-valve between said pump and ports, and a graduating-valve for establishing a predetermined ratio of supply through said intake-ports, substantially as described.

3. In a portable pump the combination with main and supplemental intake-ports located in independent receptacles, of suitable valves guarding said ports, and an adjustable valve-stem for establishing and maintaining a predetermined ratio of supply through said intake-ports, substantially as described.

4. In a portable pump the combination with a main and supplemental reservoir, of main and supplemental intake-ports located therein, check-valves guarding said ports, an adjustable valve-stem for limiting admission to said supplemental port, and a dial for indicating the position of the valve-stem, substantially as described.

5. In a portable pump the combination with main and supplemental intake-ports located in independent reservoirs, of a graduating-valve guarding one of said intake-ports, a dial and a graduated dial-plate for indicating the position of said graduating-valve, and suitable clamps for securing said parts in operative relation, substantially as described.

6. In a portable pump the combination with main and supplemental intake-ports, of independent reservoirs contained one within the other for housing said intake-ports, a graduating-valve guarding one of said intake-ports, an indicator for controlling the action of the last-named valve, and suitable latches for engaging and supporting said inner reservoir, substantially as described.

7. In a portable pump the combination with main and supplemental intake-ports, of main and supplemental reservoirs containing said intake-ports, a latch vertically adjustable upon the pump-barrel for engaging the supplemental reservoir, and a second horizontally-adjustable latch mounted upon the supplemental reservoir for engaging the main reservoir, substantially as described.

8. In a graduating-valve the combination with a valve-case, a valve-seat and valve, of an adjustable valve-stem located in the path of said valve and having a concave extremity for receiving and limiting the movement of said valve from its seat, substantially as described.

9. In a graduating-valve for pumps the combination with a valve-case, a valve-seat and valve, of an adjustable valve-stem for limiting the movement of said valve, inlet and outlet ports, and an indicating-key affixed to the valve-stem for adjusting it, substantially as described.

In testimony whereof I subscribe my signature in presence of two witnesses.

WILLIAM L. DEMING.

Witnesses:
ASHBEL CAREY,
F. J. MULLINS.